Sept. 29, 1931.   C. H. STEVENSON   1,825,556
CORRUGATED POT
Filed July 12, 1928   2 Sheets-Sheet 1
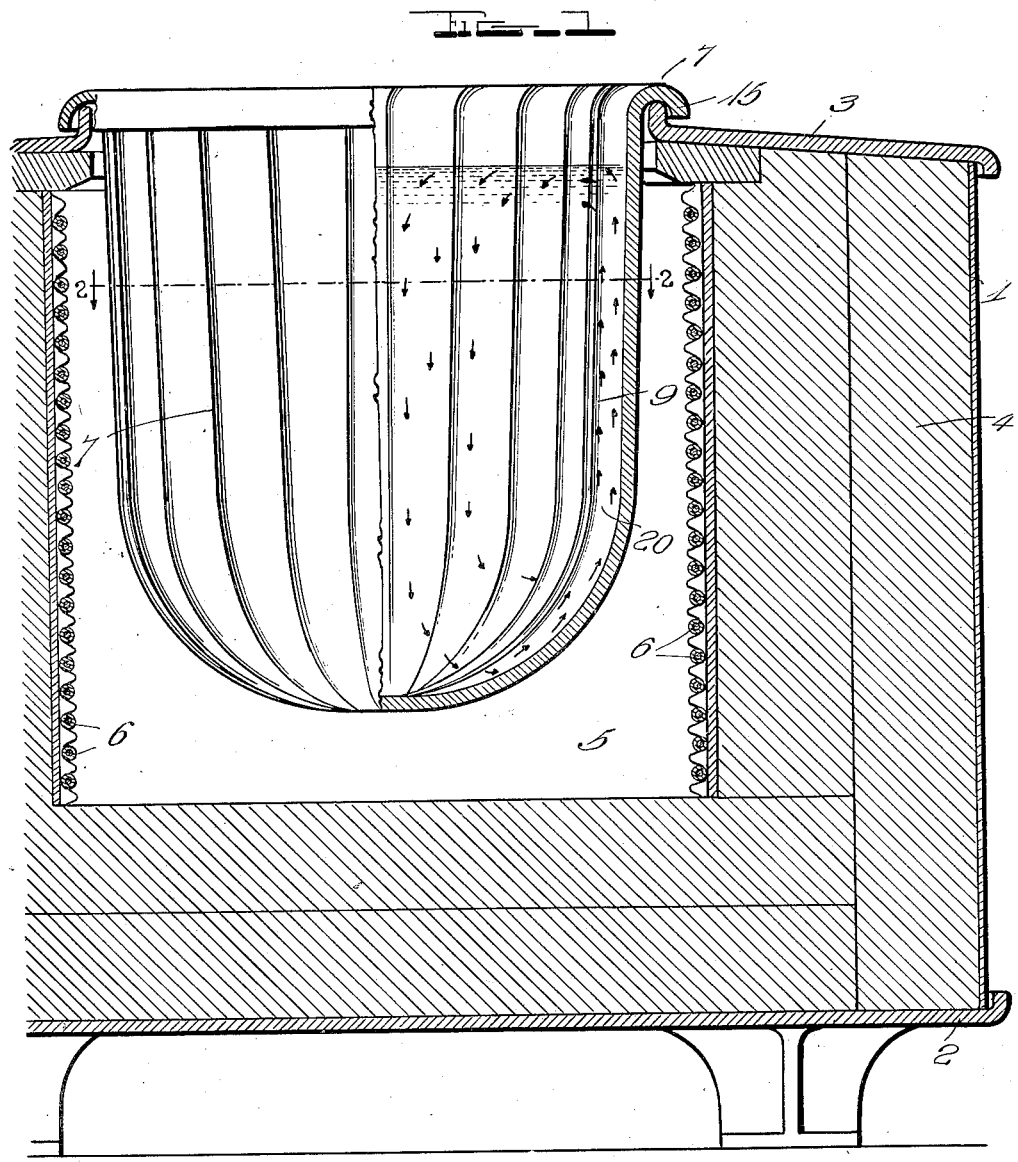
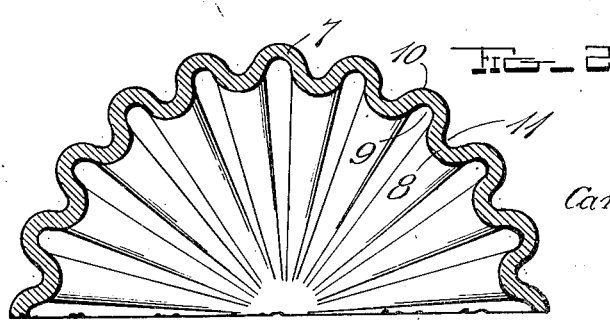
INVENTOR.
Cary H. Stevenson,
BY John B. Grady
ATTORNEY

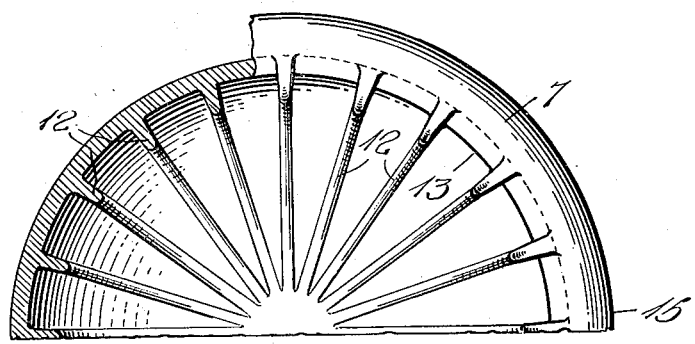
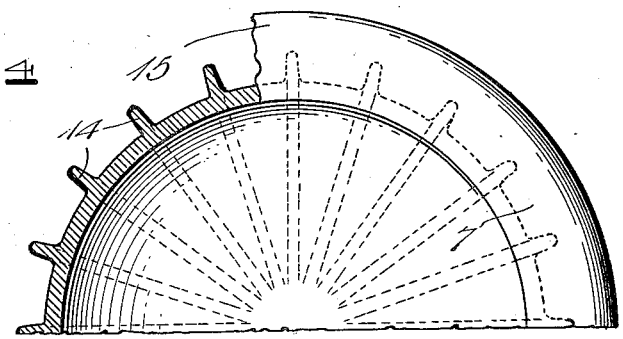
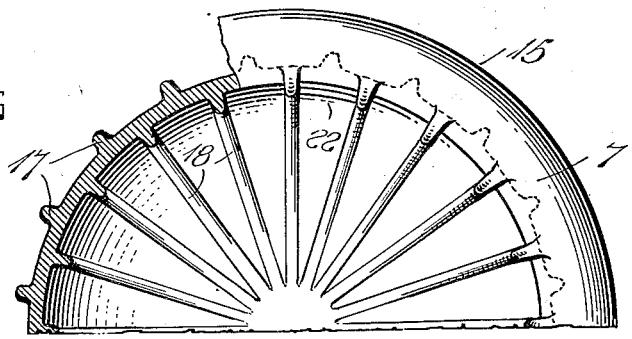

Patented Sept. 29, 1931

1,825,556

UNITED STATES PATENT OFFICE

CARY H. STEVENSON, OF CHICAGO, ILLINOIS, ASSIGNOR TO HEVI DUTY ELECTRIC COMPANY, OF MILWAUKEE, WISCONSIN, A CORPORATION OF WISCONSIN

CORRUGATED POT

Application filed July 12, 1928. Serial No. 292,218.

My invention relates broadly to furnaces and more particularly to a pot for holding a charge in a furnace and subjecting the charge to heat.

One of the objects of my invention is to provide a construction of pot for a furnace wherein the area of the outside surface of the pot is increased over the surface normally provided in a pot to increase the receptivity of the pot to heat so that the charge within the pot may be subjected to a high degree of heat from the furnace.

Another object of my invention is to provide a construction of pot for a furnace wherein the interior walls of the pot are shaped to increase the heat emissivity of the interior surface on the inside of the pot.

Still another object of my invention is to provide a construction of pot having increased strength in the walls thereof without an accompanying increase in thickness of the pot.

A further object of my invention is to provide a construction of pot for a furnace where provision is made for decreasing the shrinkage stresses or strains which are present when casting the pot.

A still further object of my invention is to provide a construction of pot which will withstand tendencies to rupture when the pot is subjected to expansion strains set up in the event that any one portion of the pot is heated to a higher temperature than an adjacent portion of the pot as, for example, by an impinging flame from a fuel burner.

Still another object of the invention is to provide a construction of pot by which the contents of the pot such as liquids or molten metal may be raised to a uniform temperature by setting up heat conduction and convection currents within the material in the pot. My invention further resides in the structure of pot described in the following specification and shown in the accompanying drawings, wherein:

Figure 1 illustrates a cross-sectional view through a furnace showing the mounting of the pot structure of my invention in the furnace where the pot is shown partially in side elevation and partially in cross-section; Fig. 2 is a cross-sectional view through one-half of the pot shown in Fig. 1 taken on line 2—2; Fig. 3 is a cross-sectional and fragmentary plan view of one-half of a pot of modified construction embodying the principles of my invention; and Figs. 4 and 5 are views similar to the view of Fig. 3 but illustrating modified forms of the pot construction of my invention.

Pot furnaces are extensively used for such purposes as the melting of metals and for the heat treating, such as hardening and drawing of steel by submerging in such materials as molten salts or lead contained in the pot.

My invention is directed to an improvement in furnaces of the pot type, the principal object being to produce a combination of pot and furnace, where from a given quantity of heat, more work may be produced in the pot; or else the same quantity of work may be produced with a lower temperature gradient between the work and the furnace chamber.

In the drawings, Fig. 1 shows in section the usual form of furnace having a steel shell 1, supported on base casting 2, and enclosed at the upper surface by a top casting 3, enclosing any suitable heat insulation or heat resisting material 4, forming furnace chamber 5. Furnace chamber 5 may be heated by any suitable means such as fuel oil or gas, but is shown heated electrically by means of any suitable electrical resistance as round elements 6. One form of pot is shown at 7, in Fig. 2, in half vertical section. The pot is substantially cylindrical in form having a bowl shaped end section and an annular flange 15.

Fig. 2 shows a half section of the pot 7, the section being on the line 2—2 of Fig. 1. In Fig. 2, corrugations are shown in flutings formed by ridges 8, alternating with grooves 9, forming the inside surface of the pot, while similar concentric surfaces on the outside of the pot are shown at 10 and 11.

Fig. 3 is a half plan view partially in cross-section of another form of pot. In Fig. 3 inwardly projecting fins, or ribs or flanges are shown at 12, having vertically extending grooves or channel-ways 13 between ribs 12.

Fig. 4 is a half plan view partially in cross-section of another form of pot having outwardly extending flanges or fins 14.

Fig. 5 is a half plan view partially in cross-section of still another form of pot having inwardly extending ribs at 18, and outwardly extending ribs or fins at 17, forming recesses or vertically extending channel-ways 22 between ribs 18.

In all five figures, 1 to 5 inclusive, the inside working space of the pots is the same.

Pots designed as in Figs. 1, 2, 4 and 5, show several methods of increasing the outside area of the pot. The added area increases the heat reception surface. This results in the conduction of more heat through the walls of the pot at any given temperature in the furnace chamber.

Fluted pot 7, contains approximately 36.4% more outside area on the side walls and bottom; the inside area 32% greater than a pot whose diameter is the same as the diameter of an inscribing circle in contact with the ridges of the fluting on the inside and having a metal thickness the same in each pot.

The pots in Figs. 1, 2, 3 and 5 show methods of increasing the inside area or heat emissivity area of the pot.

Corrugations of pots in Figs. 1 and 2, and the ribs on pots in Figs. 3, 4 and 5 can be considered as reinforced flanges for increasing the strength of the pot. By reason of the added depth of metal in the flanges or in the corrugations, the thickness of metal in the pot can be decreased to give the same total weight, but with added strength. This decrease in metal thickness also decreases the resistance to heat conduction from the furnace chamber through the wall or body of the pot to the charge in the pot.

One common cause of failure in pots of the plain sided shapes has been inherent strains or stresses set up when casting. Foundry practice for pots of non-oxidizing metal requires the use of dry sand molds or cores. Such dry sand offers exceptional resistance to the shrinkage of the casting after pouring, resulting in inherent strains. One form of pot, such as shown at 7 in Figs. 1 and 2, due to its fluted construction, gives considerable flexibility or elasticity in the shrinkage upon cooling after casting, and thus eliminates such inherent strains. The elimination of shrinkage strains produce a pot less liable to crack in service.

In the same pot, the flutings, due to the same elasticity or flexibility, will resist strains if any one portion of the pot is heated to a higher temperature than an adjacent portion of the pot as by an impinging flame from a fuel burner.

The channel-ways 13 in Fig. 3, and 22 in Fig. 5, but more pronounced in the channel-ways or flutings 9 of Figs. 1 and 2, are of comparatively small volume and have considerable area contact with the walls of the pot which form such flutings. Such small geometrical segment 9 therefore heats more readily than if the same volume had a smaller area contact with the wall of the pot. By the law of heat conduction, the flow of heat is from the hotter to the cooler body. There is, therefore, a natural resultant motion set up indicated by arrows 20 in Fig. 1. The top surface of fluid or molten material 19 is subjected to free radiation, and therefore is constantly under a tendency to be at a cooler temperature than the body of the fluid or molten material. This sets up, in effect, a stirring or inherent agitation of the fluid or molten material, and thereby distributes rapidly the heat to all parts of the material in the pot.

The heat currents which are set up within the pot are combined conduction and convection currents which serve to rapidly raise the temperature of the mass within the pot. The inherent construction of the pot is such that heat is absorbed on the outside surface of the pot and rapidly communicated to the interior contents of the pot in such manner that the maximum amount of heat flow is insured.

I have found that the pot construction of my invention is extremely practical and efficient in operation, and while I have described certain preferred embodiments of my invention, I desire that it be understood that modifications may be made and that no limitations are intended other than are imposed by the scope of the appended claims.

What I claim as new and desire to secure by Letters Patent of the United States is as follows:

1. In a furnace of the pot type, a receptacle for receiving a charge, said receptacle having a cylindrical section and a bowl shaped end section, the walls of said receptacle comprising flutings having off set portions extending in opposite directions, the off set portions extending exteriorly of said pot providing means for absorbing heat, and the off set portions extending interiorly of said pot providing means for delivering heat thus absorbed to a charge interiorly of the receptacle, the flutings increasing in depth upwardly from the bottom to the top of the bowl shaped section and being of constant depth throughout the cylindrical section of the receptacle.

2. In a furnace of the pot type, a receptacle having a substantially cylindrical section closed by a bowl shaped end section, the walls of said receptacle being deformed out of cylindrical shape for setting up paths for conduction and convection heat flow and delivering to a charge within the receptacle the maximum amount of heat absorbed from the exterior of the receptacle, the deformed parts of said receptacle being circular in section with radii increasing from the base of the bowl shaped end section to the top of the bowl shaped end section and being of uniform dimension throughout the cylindrical section.

3. In a furnace of the pot type, a receptacle having a substantially cylindrical body portion closed by a bowl shaped end portion, said body portion being formed by a multiplicity of longitudinally extending corrugations with the exterior portions of said corrugations positioned to absorb heat, and the interior portions of said corrugations extending into a charge within the receptacle for conducting heat from the exterior portions of said corrugations, said corrugations being formed on radii increasing from a minimum at the base of the bowl shaped end portion to a maximum adjacent the top of said bowl shaped end portion and being of constant radii throughout the said cylindrical body portion.

4. A pot furnace comprising a receptacle having a bowl shaped end portion and a substantially cylindrical wall portion extending therefrom, and means for establishing heat conduction paths through said receptacle comprising flutings extending around the periphery of said wall portion, said flutings being formed on adjacent oppositely directed radii, increasing from substantially zero adjacent the base of the bowl shaped end portion to a maximum adjacent the top of the bowl shaped end section, said flutings extending uniformly in longitudinal paths in the cylindrical wall portion, whereby heat convection currents incident upon the outwardly projecting portions of said flutings are directly conducted to a charge within said receptacle through the inwardly projecting portions of said flutings.

In testimony whereof I affix my signature.

CARY H. STEVENSON.